Oct. 19, 1954     A. P. WATERSON     2,691,913
DUPLICATING ATTACHMENT FOR LATHES
Filed March 21, 1947            5 Sheets-Sheet 1

INVENTOR.
ARTHUR P. WATERSON
BY
Toulmin & Toulmin
ATTORNEYS.

Oct. 19, 1954 A. P. WATERSON 2,691,913
DUPLICATING ATTACHMENT FOR LATHES
Filed March 21, 1947 5 Sheets-Sheet 2

*INVENTOR.*
*ARTHUR P. WATERSON*
BY
*Toulmin & Toulmin*
*ATTORNEYS.*

Oct. 19, 1954  A. P. WATERSON  2,691,913
DUPLICATING ATTACHMENT FOR LATHES
Filed March 21, 1947  5 Sheets-Sheet 3

INVENTOR.
ARTHUR P. WATERSON
BY
Toulmin & Toulmin
ATTORNEYS.

Oct. 19, 1954 A. P. WATERSON 2,691,913
DUPLICATING ATTACHMENT FOR LATHES
Filed March 21, 1947 5 Sheets-Sheet 4

INVENTOR.
ARTHUR P. WATERSON
BY
ATTORNEYS.

Oct. 19, 1954  A. P. WATERSON  2,691,913
DUPLICATING ATTACHMENT FOR LATHES
Filed March 21, 1947  5 Sheets-Sheet 5

INVENTOR.
ARTHUR P. WATERSON
BY
ATTORNEY.

Patented Oct. 19, 1954

2,691,913

UNITED STATES PATENT OFFICE 2,691,913

DUPLICATING ATTACHMENT FOR LATHES

Arthur P. Waterson, Tulsa, Okla., assignor to The R. K. Le Blond Machine Tool Company, Cincinnati, Ohio, a corporation of Delaware Application March 21, 1947, Serial No. 736,136

9 Claims. (Cl. 82—14)

This invention pertains to duplicating attachments for machine tools and is particularly directed to duplicating attachments applicable to engine lathes.

This application is related to my co-pending application Serial No. 675,522, filed June 10, 1946, now Patent No. 2,559,138, issued July 3, 1951.

One of the objects of this invention is to provide a simplified, efficient, and highly accurate duplicating attachment for a machine tool.

Another object of this invention is to provide an improved duplicating attachment for engine lathes.

Still another object of this invention is to provide a duplicating attachment for lathe which is capable of performing duplicating operations on work either held and driven between centers or chucked in the lathe chuck with equal facility.

Another object of this invention is to provide a duplicating attachment for lathe which may be readily applied to the lathe structure without modification in any way while at the same time providing a full range of operating conditions for any type of work to be machined in the lathe.

It is also an object of this invention to provide a duplicating attachment for lathe which may be substituted for the regular compound rest and which is capable of performing turning operations on work held on centers and in internal boring of work held in the chuck of the lathe.

It is also an object of this invention to provide a duplicating attachment in which the tracer controlled tool slide may be positioned for any direction of relative tracer control feeding movement while the template bar for actuating the tracer of the attachment moves concurrently with the tool when the tool is adjusted to any desired depth of cut.

It is also an object of this invention to provide an improved template bar means for controlling the tracer valve of the duplicating attachment.

It is also an object of this invention to provide a template bar arrangement for actuating the tracer valve which may at one time be mounted substantially parallel to the carriage travel of the lathe for performing operations on work held between centers and which may be set crosswise of the lathe carriage movement substantially parallel to the cross slide movement for performing machining operations on work held in the chuck of the lathe, the mounting means for the template bar being of universal construction capable of being applied without modification for either position of the template bar holder.

And it is also a further object to provide, in conjunction with the template bar holding means last described, a compound rest tracer control tool slide swivelly mounted on the cross slide of the lathe for clamping in any position of relative movement of the tracer control tool slide to the work.

Further features and advantages of this invention will appear from a detailed description of the drawings in which.

Figure 1:
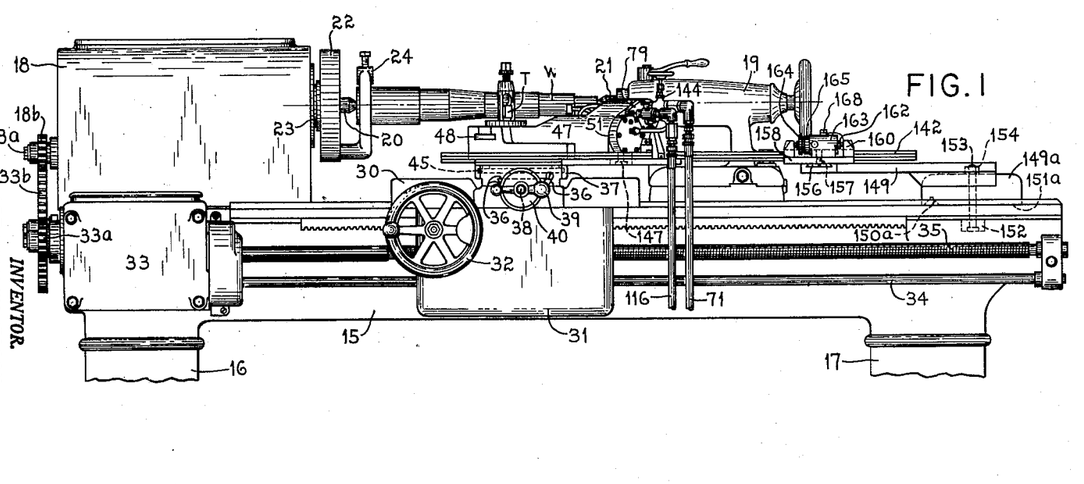
Figure 1 is a front elevation showing a typical application of this invention to an engine lathe.
Figure 2:
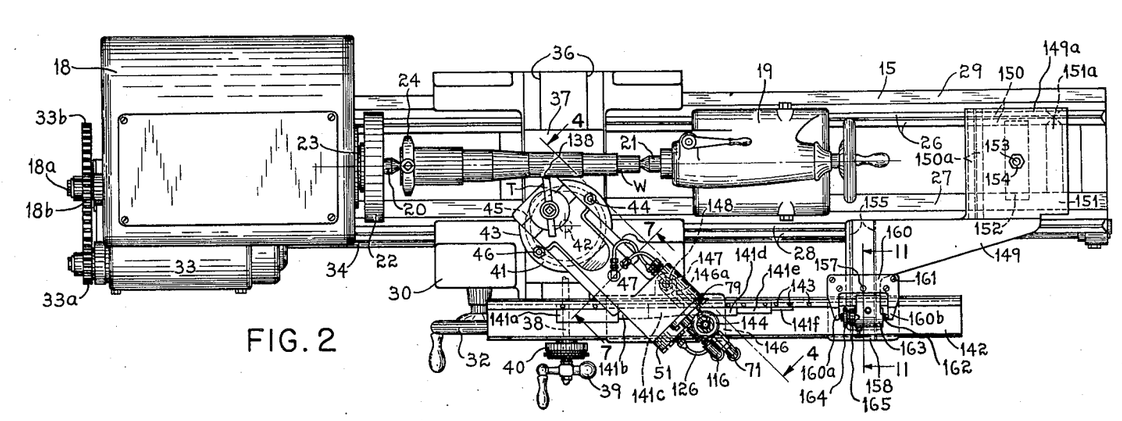
Figure 2 is a plan view of the engine lathe in Figure 1 showing the duplicating attachment applied for turning work held between centers.

As an exemplary embodiment of this invention, there is shown an engine lathe having a bed 15 carried on suitable legs 16 and 17 for convenient height of the operator. On the bed 15 is mounted the headstock 18 and the tailstock 19, each of which respectively has centers 20 and 21 for supporting a work piece W. The work W may be driven from the usual face plate 22 of the lathe spindle 23 as by means of a dog 24, as best shown in Figures 1 and 2. A work piece Wa, Figure 3, may be chucked on the lathe spindle 23 by a suitable lathe chuck 25, in which case the tailstock is moved out of the way as it is not used during chucking operations of this kind. The tailstock, under these conditions, is ordinarily slid back out of the way on the V guideway 26 and the flat 27 formed on the bed of the machine.

Also formed on the bed is the front V guideway 28 and the rear flat guideway 29 upon which is longitudinally movable the lathe carriage 30 having an apron 31 and a manipulating hand wheel 32 of conventional arrangement for manually adjusting the carriage 30 along the bed 15 of the machine. The apron is also driven by suitable power from the feed box 33 driven from the feed output shaft 18a and gearing 18b, 33a, and 33b at the left-hand end of the lathe headstock in a well-known manner. Power from the feed box 33 is transmitted through the feed rod 34 and the lead screw 35 to the apron 31 for effecting the longitudinal movement of the carriage and power actuation of the cross slide.

On suitable guideways 36 formed transversely of the carriage 30 is slidably mounted the cross slide 37 which may be actuated by the usual cross feed screw 38 and the adjusting ball crank 39 and positioned by the usual associated graduated dial 40.

In applicant's present arrangement, the duplicating attachment is a completely self-contained unit which may be quickly and easily substituted for the usual compound rest of the lathe. More particularly, in place of the compound rest is mounted the bottom swivel slide 41 which is pivotally supported by the pivot pin 42 and has a circular flanged portion 43 through which pass a pair of T slot bolts 44 operating in the annular T slot grooves 45 formed in the cross slide which is ordinarily used for the regular compound rest. Suitable clamping nuts 46 are provided for the bolts 44 so that the bottom swivel slide 41 of the duplicating attachment may be swung to any desired position and clamped in that position readily by tightening the nuts 46 as in the case of a compound rest. To remove the attachment and replace it with a compound rest or vice versa, it is merely necessary to remove the nuts 46 and to tighten them down to clamp either attachment in the desired position so that the tool slide arrangement of the machine, including the carriage and cross slide, are in no way modified or require any modification or changes in order to immediately adapt the machine to the use of applicant's duplicating attachment.

Figure 8:
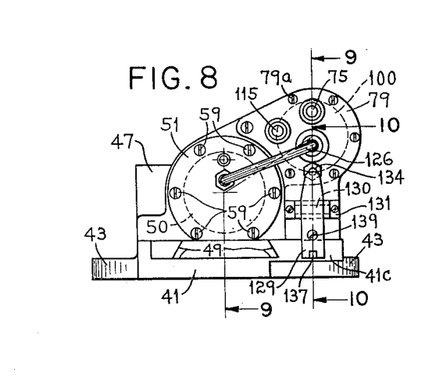
Figure 8 is an end elevation of the attachment indicated by the line 8—8 in Figure 4.

The tool actuating mechanism of the duplicating attachment comprises a tool slide 47 which is provided with any suitable tool post holder and preferably of the standard T slot type 48 so as to accommodate the same tool post and wedge and tool holder as that used with the compound rest for which the attachment was substituted. This tool slide 47 is mounted on dovetail guideways 49, Figure 8, on the duplicating attachment swivel slide base 41. The tool slide 47 is actuated on the dovetail guideways 49 by means of a hydraulic cylinder comprising a sleeve 50 having cylinder heads 51 and 52 connected to the ends of the cylinder 50 through suitable packings 53 and 54. The cylinder head 52 has an abutment surface 55 engaging a surface 56 in the tool slide 47 and also has a diameter portion 57 guided in the bore 58 in the tool slide 47. Bolts 59 passing through the cylinder head 51 and threaded into the tool slide 47 serve to bind the two cylinder heads 51 and 52 and the cylinder 50 together into a fluid tight pressure cylinder arrangement, and to thus secure the cylinder to the tool slide 47. Operating in the cylinder 50 is a piston 60 to which is attached the piston rod 61 extending through a suitable packing gland 62 in the cylinder head 50 and is connected rigidly by a suitable screw 63 to an L-shaped bracket 64 secured by the screws 65 to the bottom swivel slide 41 of the attachment. Thus, by applying fluid pressure in the chamber 66, the tool slide 47 will be fed forwardly toward the work and when fluid pressure is applied in the chamber 67 in the cylinder 50, the tool slide will be retracted away from the work.

Figure 9:
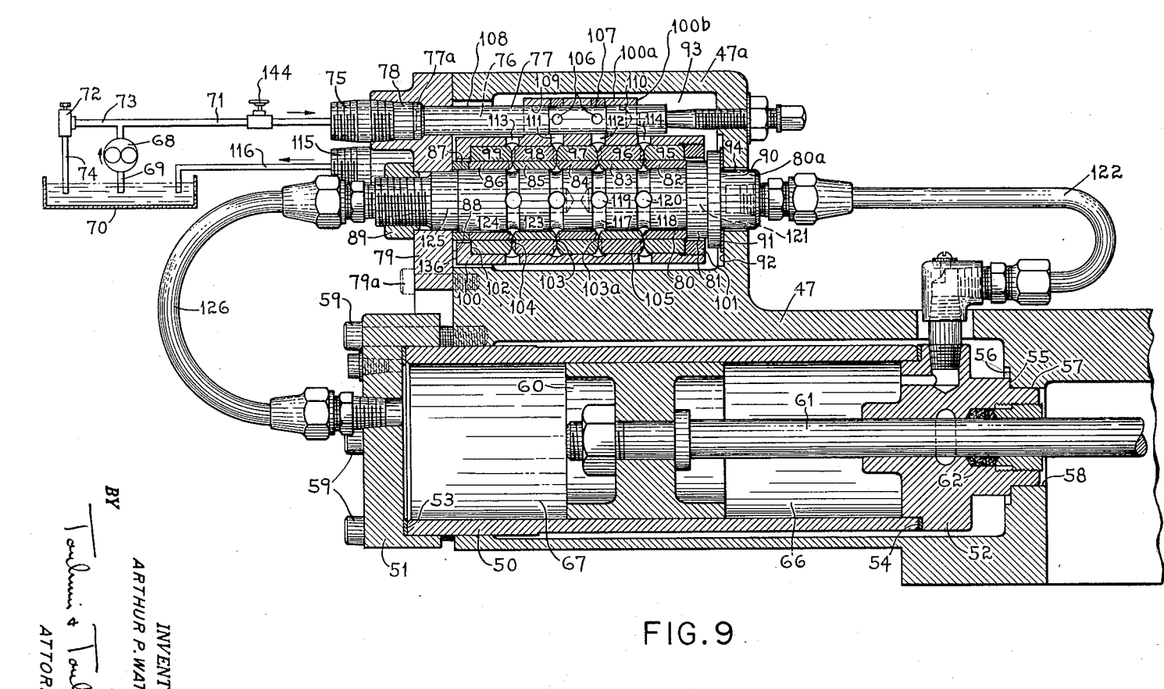
Figure 9 is a diagrammatic section indicated by the line 9—9 in Figure 8 and showing diagrammatically the hydraulic fluid pressure supply and return circuits to the attachment.
Figures 12, 13, 14, 15:
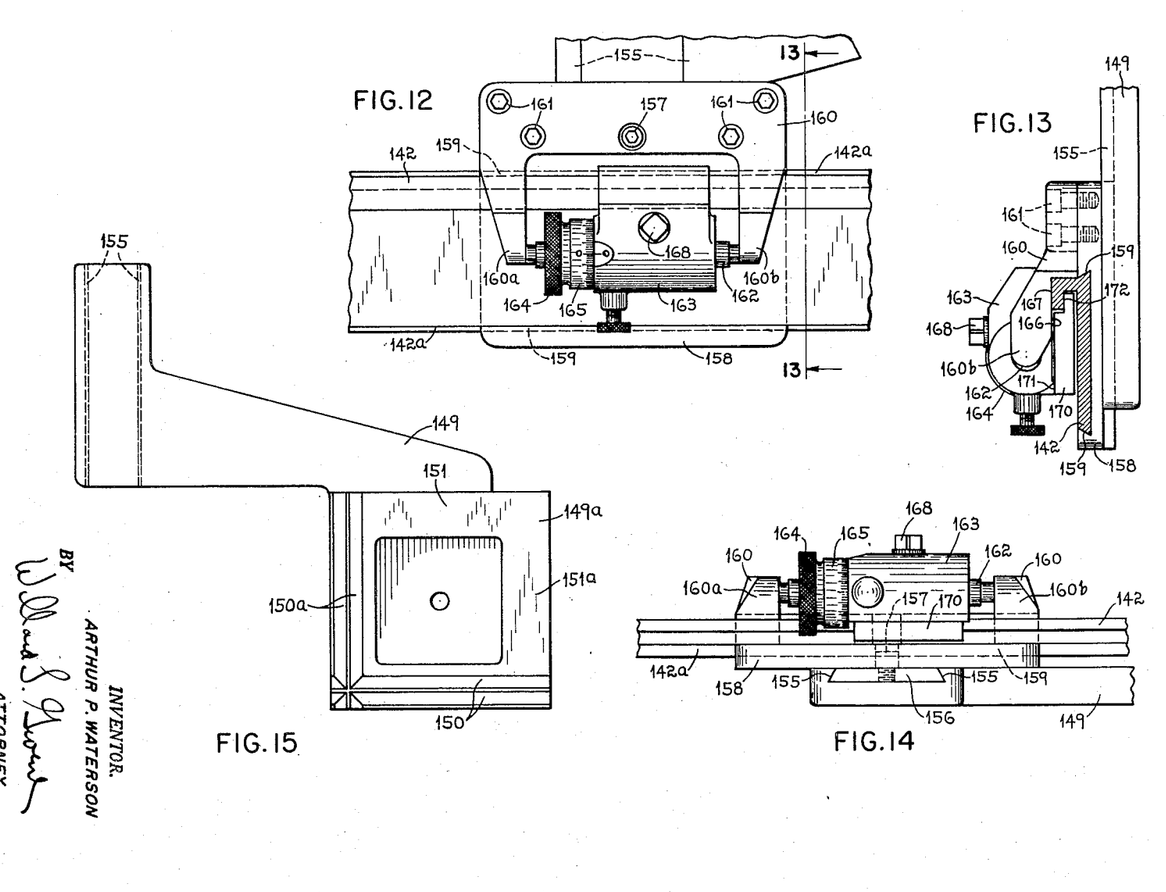
Figure 12 is an enlarged fragmentary plan view of the micrometer clamp for the template bar.
Figure 13 is an enlarged fragmentary end view indicated by the line 13—13 of Figure 12.
Figure 14 is an enlarged fragmentary elevation of the apparatus shown in Figure 12.
Figure 15 is a bottom view of the bed bracket particularly showing the multiple guideway arrangement on its base portion for mounting in a plurality of different predetermined positions on the bedways of the lathe.

Referring particularly to Figure 9, fluid pressure for actuating the tool slide 47 by the cylinder 50 is derived from a fluid pressure pump 68 which receives a supply of fluid through the suction line 69 from a fluid reservoir 70 and delivers this fluid under pressure to the pressure supply line 71 to which is connected a relief valve 72 through a line 73, discharge from the relief valve 72 returning through the line 74 to the reservoir 70, the relief valve 72 maintaining any desired maximum predetermined pressure in the line 71. Pressure from the supply line 71 is connected to the pressure input opening 75 of the attachment which communicates directly with the passageway 76 formed in the pressure supply sleeve 77, rigidly fixed by a nut 78 and its flanged end 77a to a cap 79 fixed to the integral valve body portion 47a of the tool slide 47.

Also fixed to the cap 79 is the servo valve spindle 80 having a flanged surface 81 against which abuts the port forming collar 82. Additional port forming collars 83, 84, 85, and 86 are all forced together by a collar 87 engaging the surface 88 on the inner face of the cap 79 when a nut 89 threaded on the end of the spindle 80 is tightened to draw the member firmly into position and rigidly hold it on the cap 79. With the spindle 80 and the various collars 82 to 87, inclusive, locked onto the cap 79, as described, tightening of the screws 79a to lock the cap 79 in place causes the surface 90 of the spindle 80 to wedge a soft resilient gasket 91 firmly into place against the surface 92 formed in the exhaust or discharge chamber 93 in the valve body portion 47a of the tool slide 47 so as to prevent exhaust fluid from leaking out through the space 94 around the end 80a of the member 80.

Surrounding the collars 82 to 86 is another series of mating collars 95, 96, 97, 98, and 99 which are all held together in the movable valve body sleeve 100 by a nut 101 which, when tightened, forces all of the collars 95 to 99 together up against the abutment surface 102 of the movable valve sleeve 100. By this arrangement, there are thus formed intake ports 103a and 103 and discharge or exhaust ports 104 and 105 which may be varied relative to one another by the relative sliding movement of the sleeve member 100 and its collars 95 to 99 on the collars 82 to 86, rigidly fixed to the member 80 and cap 79 rigidly attached to the valve body portion 47 of the tool slide.

Fluid pressure from the passageway 76 and the member 77 is conducted through radial openings 106 which open outwardly into an annular grooved portion 107 formed in the outer diameter 108 of the member 77. The outer diameter portion 108 nicely slides in bores 109 and 110 in a lug portion 100a formed integral with the sleeve member 100 in a substantially fluid tight relationship so that leakage between the bores 109 and 110 and the outer diameter 108 of the member 77 is such that pressure is properly maintained in the pressure supply line 71 under all operating conditions while at the same time permitting free relative sliding movement of the member 100. The annular grooves 107 is connected through passageways 111 and 112 respectively to the intake ports 103 and 103a of the valve while exhaust passageways 113 and 114 respectively communicate with the exhaust ports 104 and 105 by which fluid enters the discharge chamber 93 in the member 47a from which chamber 93 the discharge fluid returns through the fluid return outlet 115 and the line 116 back to the reservoir 70.

The intake port 103a and exhaust port 105 are connected by annular grooves 117 and 118 to radially inwardly extending passageways 119 and 120 which communicate with a passageway 121 connected by means of a supply line 122 to the forward pressure chamber 66 of the cylinder 50. The intake port 103 and discharge port 104 are connected through the annular grooves 123 and 124 to the passageway 125 in the member 80 which is connected by means of the line 126 to the return chamber 67 of the cylinder 50. Thus, by reciprocating the valve body 100, the various intake ports 103 and 103a and exhaust ports 104 and 105 are so regulated as to apply greater pressure in one chamber or the other, 66 or 67, of the cylinder 50 to effect controlled reciprocation of the tool slide 47.

The valve body 100 is normally biased by a spring 127 carried on a pin 128 fixed in the body portion 47a and abutting against the surface 92, at one end adjacent the pin 128 and abutting the surface 100b of the lug 100a of the valve sleeve 100 so that fluid pressure is normally applied into the chamber 66 of the cylinder 50 to effect forward infeed movement of the tool slide 47. The movement of the valve sleeve 100 is controlled by a tracer mechanism, best shown in Figures 4 and 10, comprising a rocking tracer or stylus arm 129 pivotally mounted on a pin 130 held in a bracket 131 secured by screws 132 to the cover plate 79 which in turn is rigidly fixed to the tool slide 47 as described. The upper end of the arm 129 has a surface 133 engaging the outer end of a pin 134 which passes through a guide bushing member 135 and extends inwardly and engages the surface 136 of the valve sleeve member 100. On the other end of the tracer arm member 129 is the tracer finger or stylus 137 having a pointed end or tip 137a corresponding in configuration preferably to that of the tip 138 of the cutting tool T being utilized with the duplicating attachment. A stop screw 139 threaded into the arm 129 and engaging the surface 140 of the cover plate 79 serves to limit the outward movement of the sleeve member to feed forward position as normally brought about by the bias spring 127 as explained. The tip 137a of the tracer finger 137 engages an appropriate template 141 which may consist of a series of individual pieces as shown in Figure 2 such as the pieces 141a, 141b, 141c, 141d, 141e, and 141f secured to a template bar 142 by suitable set screws 143 as best shown in Figure 4.

Thus, when fluid pressure is applied to the attachment by opening of the control valve 144, the pressure will first be normally applied into the chamber 66 of the cylinder 50 to cause tool slide 47 to move toward the work. This motion continues until the tip 137a of the tracer finger 137 engages one of the template members 141 whereupon the tracer arm 129 will be rocked, clockwise as shown in Figure 4, to move the sleeve member 100 to a neutral position to balance the pressure in both chambers 66 and 67 and maintain the tool slide in a fixed position. As relative movement of the template pieces with respect to the tip 137a brings different surfaces into engagement with this tip, it will be rocked further clockwise and released to counterclockwise rotation by the spring 127 to effect an automatic tracer control operation of a tool slide to duplicate any desired pattern placed on the template bar 142.

Figures 3, 6, 10, 11:
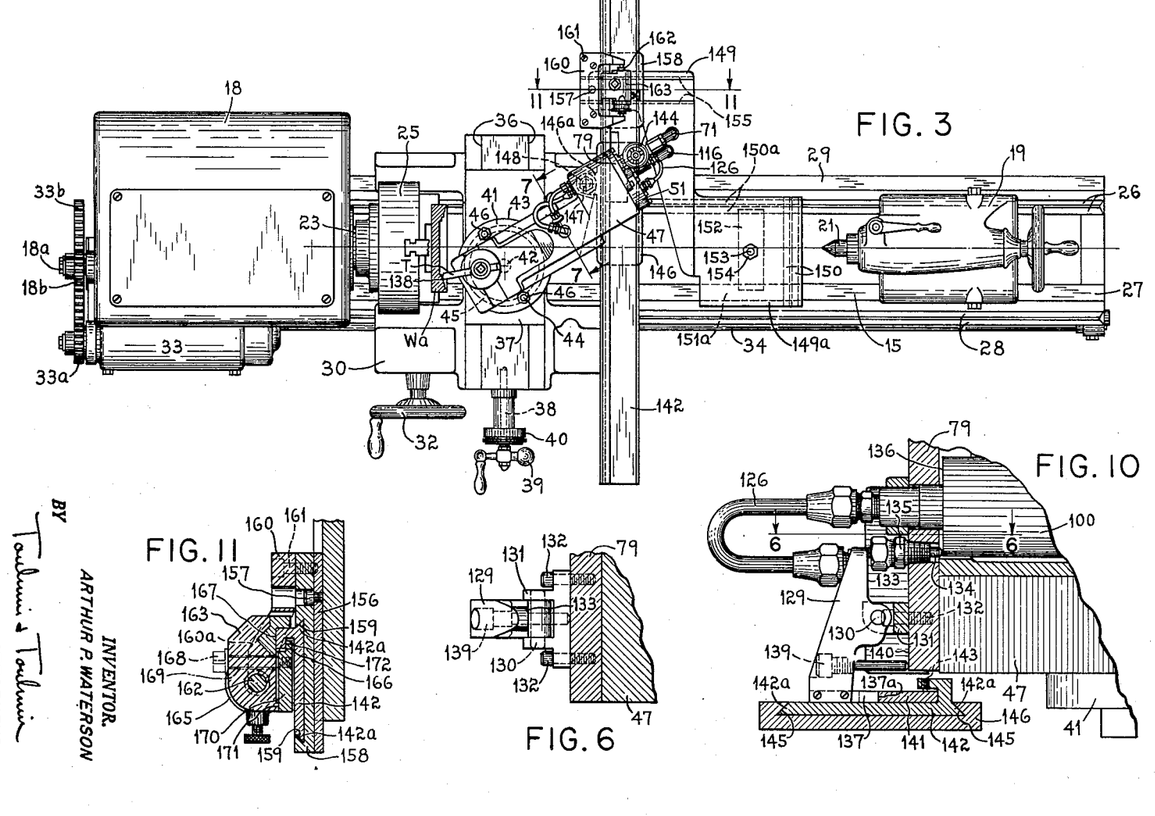
Figure 3 is a plan view of the lathe similar to Figure 2 but showing the duplicating attachment applied to the lathe for machining work held in the chuck thereof.
Figure 6 is a fragmentary section on the line 6—6 in Figures 4 and 10, particularly showing the tracer valve actuating finger or stylus.
Figure 10 is an enlarged fragmentary section through the tracer finger or stylus on the line 10—10 of Figure 8.
Figure 11 is a section through the micrometer adjusting bracket on the line 11—11 of Figures 2 and 3.

The template guide bar 142 is mounted in a unique manner such that it may be placed, in one instance, substantially parallel to the longitudinal movement of the lathe carriage or lengthwise of the bed guideways, as shown in Figure 2, or in a transverse position parallel to the cross slide movement or crosswise of the bed guideways, as shown in Figure 3. It is to be noted that when the template bar 142 is positioned substantially parallel to the bed for longitudinal feeding movement of the carriage that the transverse movement for depth of cut setting is effected in the aforementioned duplicating attachment by adjustment of the cross feed screw 38 by the handle 39 bodily carries the template guide member 146, template bar 142, and templates transversely with it. The relationship of the tracer finger to the template under these conditions is always the same for any position of adjustment of the cross slide for depth of cut of the tool. When the template bar 142 is positioned in a transverse arrangement, as shown in Figure 3, it is to be noted that longitudinal adjustment of the carriage along the bed by the hand wheel 32 then becomes the depth of cut adjustment for the tool and the cross slide movement in this case is utilized for the feeding movement. Here again the relationship of tracer finger and template remains unchanged during adjustment of carriage for depth of cut.

Figures 4, 5:
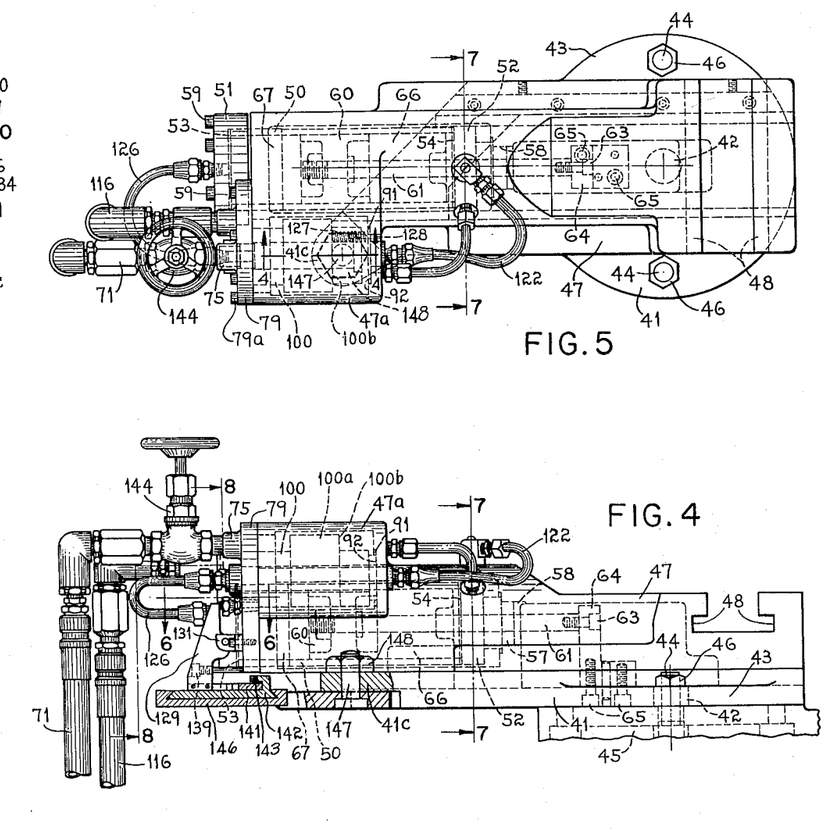
Figure 4 is an enlarged fragmentary view of the attachment indicated by the line 4—4 in Figure 2, and partly in section on the line 4—4 in Figure 5.
Figure 5 is a plan view of the attachment shown in Figure 4.
Figure 7:
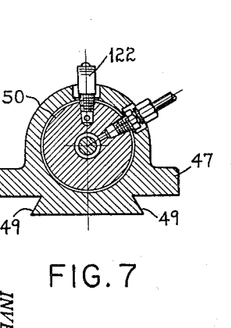
Figure 7 is a fragmentary transverse section through the hydraulic actuating cylinder for the tool slide indicated by the line 7—7 in Figures 2, 3, 4, and 5.

The template bar 142 is provided with a pair of dovetailed guideway surfaces 142a which nicely slide with mating guideway surfaces 145, Figures 2, 10, and 11, in the swivel template guide member 146 which has an integral lug 146a clamped rigidly by means of a bolt 147 and clamping nut 148 to an integral lug 41c of the duplicating attachment swivel slide 41, Figure 4. When the template bar is to be mounted parallel to the bed of the machine, as in Figure 2, the member 146 is shown positioned so that its dovetailed guideways 145 extend parallel to the bedways and longitudinal movement of the carriage and is locked in this position for any desired angular setting position of the swivel slide 41 by tightening the clamping nut 148. The other end of the template bar 142 is held against longitudinal movement relative to the frame or bed of the machine so that as the carriage moves along the bed, the bar 142 will move relatively longitudinally through the guide member 146 and cause the various template members 141 to engage and actuate the tracer finger point 137a to control the movement of the tool slide 47 as described.

The arrangement comprises a bed bracket 149 having a square base portion 149a having a V-groove 150 and a flat 151 machined on it for resting on the tailstock bedways 26 and 27, respectively, of the lathe bed. A suitable clamping bracket 152, similar to a tailstock clamping bracket, is pulled up underneath the ways 26 and 27 in the usual manner by means of the clamping bolt 153 and clamping nut 154 to secure the bracket 149 rigidly to the bed as shown in Figure 2. In the bed bracket 149 is formed a pair of dovetail guideways 155 which, when the bracket is positioned, as in Figure 2, for the parallel or lengthwise positioning of the template bar 142 with the bedways, extends transversely of the bedways and guides a dovetail pivot plate 156 for transverse movement. This plate 156 allows freedom of movement of the template bar bodily in a transverse direction. In the plate 156 is fixed a pivot stud 157 on which stud is mounted the rectangular plate 158 which rests on the top faces of the plate 156 and bed bracket 149, respectively. Referring more particularly to Figure 11, there is formed in the plate member 158 a dovetail guideway having the surfaces 159 which receive and guide the surfaces 142a of the template bar 142.

The template bar 142 is locked against longitudinally sliding movement in the dovetail guideway 159 by means of a micrometer adjustable clamp comprising a U-shaped member 160 secured to the member 158 by suitable screws 161 and having extended arm pieces 160a and 160b having abutment surfaces between which nicely fits a micrometer adjusting screw 162 appropriately carried for relative axial adjustment in a clamping block 163 and adjustable axially in the bracket by a suitable micrometer thumb nut 164 having a graduated dial 165. The clamping block 163 may be clamped at any point along the template bar 142 since it is provided with a clamping surface 166 which engages the surface 167 on the template bar and is provided with a clamping screw 168 having a passageway through a clearance hole 169 in the block 163 and threaded into a clamping plate 170 which engages a clamping heel surface 171 on the clamping block 163 so that when the screw 168 is tightened, the surface 166 of the block 163 is drawn down firmly against the surface 167 by engagement of the plate 170 with the underneath surface 172 of the template bar 142. Thus, in setting up the machine, the template bar may be clamped by tightening the screw 168 in any desired approximate position. Final minute adjustments of the template bar to longitudinally position the various template pieces in exact axial location relative to the work piece to be cut may be obtained by adjusting the thumb nut 164 and checking the amount of relative movement of the template bar 142 and the plate member 158 and the member 160 on the graduated collar 165.

With this arrangement thus set up as shown in Figure 2, it is obvious that the adjustment of the cross slide for depth of cut by the hand wheel 39 causes the member 146 to bodily move the template bar while maintaining it in parallel relationship with the bed by the sliding movement of the plate 156 in the dovetail guideways 155 in the bed bracket 149 and with the pivotal mounting clamp bolt 147 securely tightened so that while making any axial adjustments of the tool for desired diameters on the work piece, the template bar at all times is maintained in precise unchanged position relative to the finger 137 of the tracer control valve for the duplicating attachment. Also, at all times, regardless of what adjustment is made in the carriage longitudinally of the bed, the template bar is rigidly held against longitudinal movement so that as the carriage feeds along relatively to the template 142, the proper contour shape is formed on the work by the cutting tool T. During the form turning operation in this set-up the cross slide remains stationary, only the carriage and tool slide moving to perform the cut on the work.

The aforementioned arrangement of Figure 2 is usually preferable when long work is being turned between centers, as shown. In certain instances when it is desired to do internal form turning on a work piece held in the chuck 25 of the lathe as shown in Figure 3, the clamping bolt 147 and nut 148 of the pivot mounting for the guide member 146 is released to allow the template bar assembly to be swung around to a transverse or crosswise position of the lathe as shown with the guide bar now extending crosswise of the lathe and parallel to the cross slide movement. The bed bracket member is formed with a second series of V and flat surfaces 150a and 151a which are now placed on the respective tailstock guideways 26 and 27 of the bed, the tailstock in this instance being removed from the lathe or moved back out of the way as shown in Figure 3. In this case, the bracket 149 now extends towards the back of the lathe with the guideways 155 extending parallel to the bedways and the clamping bracket for restricting movement of the guidebar 142 through the clamp block 163, as described, is now positioned on the plate 156 sliding in the guideway 155 so that longitudinal adjustment of the lathe carriage along the bed automatically moves the guide bar 142 with it to maintain exact relationship at all times of the template on the template bar 142 relative to the tracer finger 137 of the attachment. In this arrangement, power feed is then applied to the cross feed screw while the carriage remains in the desired adjusted position so that the relative movement of the tracer of the attachment and the template on the guide bar 142 then takes place to perform the desired form turning operation on the work piece Wa in the chuck 25. In this set-up the carriage remains stationary during the cutting operation, with only the cross slide and tool slide moving to make the cut on the workpiece.

There has thus been provided a duplicating attachment for the lathe which may be readily substituted for the normal compound rest of the lathe and which has a template bar cooperating with it which may be set either parallel to the bedways or transverse thereof for performing work either on centers or in the chuck of the lathe. The attachment is also readily adaptable to be swung to any desired angular position relative to the axis of the work spindle to accommodate the tracing member and the cutting tool to the most satisfactory cutting angles and positions for any character and type of work surface to be machined. It is to be further noted that the entire attachment includes the tool slide with an integral actuating cylinder and tracer control valve in a single unitary structure readily substitutable on the lathe carriage for the compound rest of the lathe. And it will be further noted that the template member is also carried and supported for relative guided movement with respect to the tracer controlled valve of the attachment by a mounting device carried by the swivel base of the attachment mounted on the carriage of the lathe.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. A support for a template bar of a duplicating attachment for a lathe having a bed, and ways on said bed, a bed bracket including a base portion, a first set of guideways formed on said base portion adapted to engage and locate said bracket in one position on said bed, a second set of guideways on said base portion in angularly related position relative to said first set of guideways and adapted to engage and locate said bracket in another position on said bed, a third set of guideways on said base portion, a pivot plate slidably mounted on said third set of guideways, a pivot stud fixed in said pivot plate, a template bar engaging plate pivotally mounted on said pivot stud, and means for securing said template bar to said template bar engaging plate.

2. A support for a template bar of a duplicating attachment for a lathe having a bed, and ways on said bed, a bed bracket including a base portion, a first set of guideways formed on said base portion adapted to engage and locate said bracket in one position on said bed, a second set of guideways on said base portion in angularly related position relative to said first set of guideways and adapted to engage and locate said bracket in another position on said bed, a third set of guideways on said base portion, a pivot plate slidably mounted on said third set of guideways, a pivot stud fixed in said pivot plate, a template bar engaging plate pivotally mounted on said pivot stud, means for securing said template bar to said template bar engaging plate, including slideways in said template bar engaging plate slidingly engaging said template bar, and a clamp means inter-acting between said template bar engaging plate and said template bar to lock said template bar to said template bar engaging plate.

3. A support for a template bar of a duplicating attachment for a lathe having a bed, and ways on said bed, a bed bracket including a base portion, a first set of guideways formed on said base portion adapted to engage and locate said bracket in one position on said bed, a second set of guideways on said base portion in angularly related position relative to said first set of guideways and adapted to engage and locate said bracket in another position on said bed, a third set of guideways on said base portion, a pivot plate slidably mounted on said third set of guideways, a pivot stud fixed in said pivot plate, a template bar engaging plate pivotally mounted on said pivot stud, and means for securing said template bar to said template bar engaging plate, including slideways in said template bar engaging plate slidingly engaging said template bar, and a micrometer adjustable clamp comprising an abutment member fixed on said template bar engaging plate, a clamp slidingly engaging said template bar, a micrometer screw carried in said clamp and engaging said abutment member, and clamp bolt means for securing said clamp to said template bar.

4. A bed bracket for supporting a template bar of a duplicating attachment for a lathe comprising, a base portion, a plurality of sets of angularly disposed guideways formed on said base portion to engage the bed ways of the lathe so as to position said bracket in a plurality of predetermined fixed positions on said lathe, a slide movably mounted on said bed bracket for movement parallel to one of said sets of guideways, and a clamp device pivotally mounted on said slide and adapted to grip said template bar to restrict longitudinal movement of said template bar for either position of said bed bracket on the bed of said lathe.

5. A bed bracket for supporting a template bar of a duplicating attachment for a lathe comprising, a base portion, a plurality of sets of angularly disposed guideways formed on said base portion to engage the bed ways of the lathe so as to position said bracket in a plurality of predetermined fixed positions on said lathe, an arm formed integral with one edge of said base portion and extending beyond said edge in a direction parallel to one of said sets of guideways on said base portion, a slide movably mounted on the outer end of said arm reciprocatable in a perpendicular direction relative to said one set of guideways, and a clamping member pivotally mounted on said slide adapted to grip said template bar.

6. A support for a template bar of a duplicating attachment for a lathe having, a bed, ways on said bed, a bed bracket, a base portion on said bracket, bed way engaging abutment surfaces on said base portion, guideways on said base portion, a pivot plate slidably mounted on said guideways, a pivot stud fixed in said pivot plate, a template bar engaging plate pivotally mounted on said pivot stud, means for securing said template bar to said template bar engaging plate, including slide ways in said template bar engaging plate slidingly engaging said template bar, and a clamp means interacting in said template bar engaging plate and said template bar to lock said template bar to said template bar engaging plate.

7. A support for a template bar of a duplicating attachment for a lathe having, a bed, ways on said bed, a bed bracket, a base portion on said bed bracket, a plurality of bed contacting abutment surfaces on said base portion, clamp means for securing said base portion to said bed, guideways on said base portion, a pivot plate slidably mounted on said guideways, a pivot stud fixed in said pivot plate, a template bar engaging plate pivotally mounted on said pivot stud, means for securing said template bar to said template bar engaging plate, including slide ways in said template bar engaging plate slidingly engaging said template bar, and a micrometer adjustable clamp comprising an abutment member fixed on said template bar engaging plate, a clamp slidingly engaging said template bar, a micrometer screw carried in said clamp and engaging said abutment member, and clamp bolt means for securing said clamp to said template bar.

8. A support for a template bar of a duplicating attachment for a lathe having, a bed, ways on said bed, a carriage longitudinally movable on said ways, a bed bracket, a base portion on said bed bracket, bed way engaging surfaces on said base portion, transverse guideways on said base portion, a plate slidably mounted on said guideways, a pivot stud fixed to said plate, a template bar engaging plate pivotally mounted on said pivot stud, means for clamping said template bar to said template bar engaging plate, and further support means for said template bar including, longitudinally disposed guideways supported by said carriage and located parallel to said bed ways slidingly engaging said template bar.

9. A support for a template bar of a duplicating attachment for a lathe having, a bed, ways on said bed, a carriage longitudinally movable on said ways, a bed bracket, a base portion on said bed bracket, bed way engaging surfaces on said base portion, transverse guideways on said base portion, a first plate slidably mounted on said guideways, a second plate fixed against transverse and longitudinal movement on said first plate, a micrometer clamp member, means for adjustably clamping said micrometer clamp member to said template bar, a micrometer screw mounted in micrometer clamp member engaging said second plate member, and further support means for said template bar including longitudinally disposed guideways supported by said carriage and located parallel to said bed ways slidingly engaging said template bar.

References Cited in the file of this patent

UNITED STATES PATENTS

| Number | Name | Date |
|---|---|---|
| 1,195,293 | Townsend | Aug. 22, 1916 |
| 1,206,528 | Goddu | Nov. 28, 1916 |
| 1,289,674 | Coradi | Dec. 31, 1918 |
| 1,314,744 | Groene | Sept. 2, 1919 |
| 1,635,285 | Lovely | July 12, 1927 |
| 2,051,127 | Bickel | Aug. 18, 1936 |
| 2,437,570 | Von Zelewsky | Mar. 9, 1948 |
| 2,474,134 | Waterson | June 21, 1949 |
| 2,559,138 | Waterson | July 3, 1951 |

FOREIGN PATENTS

| Number | Country | Date |
|---|---|---|
| 202,406 | Great Britain | Aug. 20, 1923 |